(12) United States Patent
Park

(10) Patent No.: US 9,499,084 B2
(45) Date of Patent: Nov. 22, 2016

(54) APPARATUS FOR ADJUSTING HEIGHT AND ANGLE OF FOOTREST SUPPORT FOR CONSTRUCTION EQUIPMENT

(71) Applicant: VOLVO CONSTRUCTION EQUIPMENT AB, Eskilstuna (SE)

(72) Inventor: Hyun-Soo Park, Busan (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/893,649

(22) PCT Filed: May 28, 2013

(86) PCT No.: PCT/KR2013/004650
§ 371 (c)(1),
(2) Date: Nov. 24, 2015

(87) PCT Pub. No.: WO2014/192991
PCT Pub. Date: Dec. 4, 2014

(65) Prior Publication Data
US 2016/0107557 A1    Apr. 21, 2016

(51) Int. Cl.
*B60N 3/06* (2006.01)
*B60N 2/24* (2006.01)
*E02F 9/08* (2006.01)

(52) U.S. Cl.
CPC ............ *B60N 3/063* (2013.01); *B60N 2/24* (2013.01); *E02F 9/0858* (2013.01)

(58) Field of Classification Search
CPC ........ B60N 3/063; B60N 2/24; E02F 9/0858
USPC ....................................................... 296/75
See application file for complete search history.

(56) References Cited

U.S. PATENT DOCUMENTS

| 1,478,551 A | * | 12/1923 | Castle | G05G 5/18 164/DIG. 8 |
| 4,946,013 A | * | 8/1990 | Conlyn, Jr. | B60W 30/18 180/333 |

(Continued)

FOREIGN PATENT DOCUMENTS

| JP | H07002559 U | 1/1995 |
| KP | 2019950008612 U | 4/1995 |

(Continued)

OTHER PUBLICATIONS

International Search Report and Written Opinion of the International Search Authority (in English and Korean) and Written Opinion of the International Search Authority (in Korean) for PCT/KR2013/004650, mailed Feb. 21, 2014; ISA/KR.

*Primary Examiner* — Pinel Romain
(74) *Attorney, Agent, or Firm* — Harness, Dickey & Pierce, P.L.C.

(57) ABSTRACT

An apparatus for adjusting a height and an angle of a footrest support for a construction machine is disclosed, which can adjust the height and the angle of the footrest support, on which an operator puts his/her foot, in accordance with physical conditions of the operator. The apparatus includes pedal plates, a pedal arm having one end fixed to a second bracket and the other end having a through-hole for adjustment of a height of the pedal plate, a fixing plate installed in a predetermined position of the pedal arm, a fixing pin coupled to the through-hole of the fixing plate and a fastening plate installed in predetermined positions of left and right sides in a cabin and having fastening holes for adjustment of the height of the pedal plate formed thereon at equal intervals in upward and downward directions.

8 Claims, 4 Drawing Sheets

(56) References Cited

U.S. PATENT DOCUMENTS

| | | | |
|---|---|---|---|
| 8,444,203 B2* | 5/2013 | Ohtsubo | B60N 2/0252 296/75 |
| 2013/0220168 A1* | 8/2013 | Volke | A47C 16/025 105/342 |
| 2014/0001787 A1* | 1/2014 | Miller | B60N 3/066 296/75 |
| 2014/0210227 A1* | 7/2014 | Meszaros | B60N 3/06 296/75 |
| 2014/0292017 A1* | 10/2014 | Bouillon | B60N 3/06 296/37.14 |
| 2015/0165941 A1 | 6/2015 | Park | |

FOREIGN PATENT DOCUMENTS

| | | |
|---|---|---|
| KR | 2019960009002 Y1 | 10/1996 |
| KR | 2019980025978 U | 8/1998 |
| KR | 200244012 Y1 | 10/2001 |

\* cited by examiner

Prior Art

APPARATUS FOR ADJUSTING HEIGHT AND ANGLE OF FOOTREST SUPPORT FOR CONSTRUCTION EQUIPMENT

TECHNICAL FIELD

The present invention relates to an apparatus for adjusting a height and an angle of a footrest support for a construction machine. More particularly, the present invention relates to an apparatus for adjusting a height and an angle of a footrest support for a construction machine, which can adjust the height and the angle of the footrest support, on which an operator puts his/her foot, in accordance with physical conditions of the operator.

BACKGROUND OF THE INVENTION

According to a footstep support of a construction machine in the related art as illustrated in FIG. 1, both ends of a bar-shaped footrest support 1, on which an operator can put his/her foot, are fixed to predetermined positions of left and right side pillars 3 and 4 in a cabin 2.

In the case of loading/unloading equipment on/from a truck or in the case of performing felling operation in forest land, the equipment may become inclined, and in this case, the operator can keep the body balance through putting of his/her foot on the footrest support 1.

The footrest support 1 in the related art is integrally fixed to the side pillars 3 and 4 of the cabin. That is, it is not possible to adjust the height and the angle of the footrest support 1 in accordance with physical conditions of the operator, such as the height and the weight of the operator. Due to this, in the case where the height of the footrest support 1 is relatively low or high on the basis of the physical conditions of the operator, the operator in the equipment that is on an inclined place can hardly keep the body balance.

Further, in the case where the operator performs work in a state where the operator puts his/her foot on the footrest support 1, the foot on the footrest support 1 may interfere in an operator's forward visual field to lower stability and work efficiency.

SUMMARY OF THE INVENTION

Accordingly, the present invention has been made to solve the aforementioned problems occurring in the related art, and one subject to be achieved by the present invention is to provide an apparatus for adjusting a height and an angle of a footrest support for a construction machine, which can adjust the height and the angle of the footrest support, on which an operator puts his/her foot, in accordance with physical conditions of the operator, and thus can provide convenience and stability to the operator.

Another subject to be achieved by the present invention is to provide an apparatus for adjusting a height and an angle of a footrest support for a construction machine, which can easily adjust the height and the angle of the footrest support through fastening of bolts, and can be easily applied to the equipment due to its simple structure.

Still another subject to be achieved by the present invention is to provide an apparatus for adjusting a height and an angle of a footrest support for a construction machine, which does not interfere in an operator's forward visual field when an operator puts his/her foot on the footrest support.

Technical Solution

In accordance with an embodiment of the present invention, there is provided an apparatus for adjusting a height and an angle of a footrest support for a construction machine, which includes a pair of pedal plates on which an operator's foot is put; a first bracket formed on the other side of the pedal plate and having a first through-hole formed in the center thereof and a through-hole for adjustment of an angle of the pedal plate formed on the circumference thereof outside the first through-hole; a second bracket formed on the other side of the pedal plate to face the first bracket and having a second through-hole formed in the center thereof; a pedal arm having one end fixed to the second bracket through the first through-hole and the other end having a through-hole for adjustment of a height of the pedal plate formed thereon; a fixing plate installed in a predetermined position of the pedal arm and having a through-hole formed thereon; a fixing pin coupled to the through-hole of the fixing plate and the through-hole for adjustment of the angle of the pedal plate, which selectively coincides with the through-hole, to keep the adjusted angle of the pedal plate; a fastening plate installed in predetermined positions of left and right sides in a cabin and having fastening holes for adjustment of the height of the pedal plate formed thereon at equal intervals in upward and downward directions; and a fastening member coupled to the through-hole for adjustment of the height of the pedal plate and the fastening holes for adjustment of the height of the pedal plate, which selectively coincides with the through-hole, to fix the other end of the pedal arm to the fastening plate in order to adjust the height of the pedal plate.

The apparatus may further include a pedal plate cover having the other side having an accommodation groove formed thereon to accommodate the pedal plate and fixed to the pedal plate accommodated in the accommodation groove through a fastening member.

The one end of the pedal arm may be fastened to the second bracket by a hand bolt that is coupled to the second through-hole and a coupling hole of the pedal arm.

A non-slip may be formed on an upper surface of the pedal plate cover.

The fastening plate, to which the pedal arm is fixed, may be installed in the predetermined positions of left and right side pillars of the cabin so that the operator's foot put on the pedal plate is maintained to avoid an interference in an operator's forward visual field.

The apparatus may further include a secession prevention projection formed at an edge of an outside of the upper surface of the pedal plate cover to prevent the operator's foot from seceding from the pedal plate cover.

The pedal plate cover may be formed of a rubber material.

The through-holes for adjustment of the angle of the pedal plate may be symmetrically formed on the same circumference based on the first through-hole of the first bracket.

Advantageous Effect

According to an embodiment of the present invention having the above-described configuration, since the height and the angle of the footrest support, on which an operator puts his/her foot during working, can be adjusted in accordance with the physical conditions of the operator, the operator can keep the body balance even in the case where the equipment is on the inclined place, and thus convenience, workability, and stability can be improved.

Further, since the height and the angle of the footrest support can be easily adjusted through fastening of the bolts, the footrest support can be easily applied to the equipment with its simple structure, and thus the manufacturing cost can be saved.

Further, since the pedal-shaped footrest support is mounted adjacent to the left and right side pillars in the cabin, the operator's foot that is put on the footrest support does not interfere in then operator's forward visual field, and thus the workability can be improved.

BRIEF DESCRIPTION OF THE DRAWINGS

The above objects, other features and advantages of the present invention will become more apparent by describing the preferred embodiments thereof with reference to the accompanying drawings, in which.

EXPLANATION OF REFERENCE NUMERALS FOR MAIN PARTS IN THE DRAWING

Figure 1:
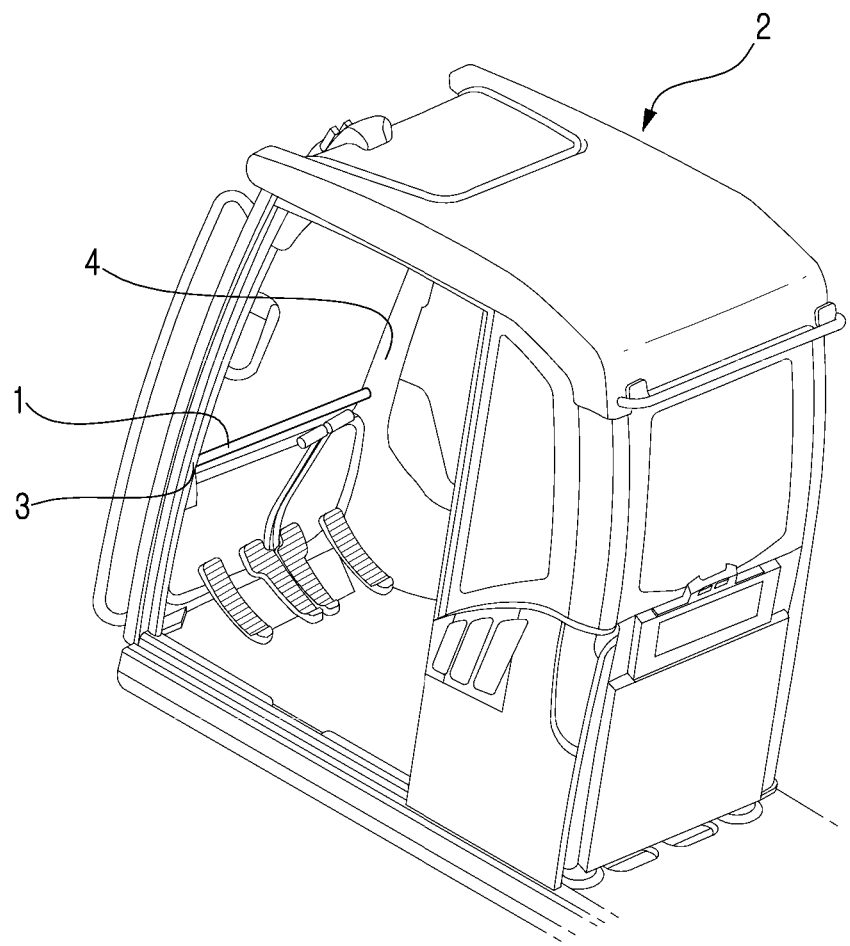
FIG. 1 is a schematic view illustrating an inside of a cabin, in which a footstep support is mounted, of a construction machine in the related art.

10: pedal plate
11: first through-hole
12: through-hole for adjusting an angle of a pedal plate
13: first bracket
14: second through-hole
15: second bracket
16: through-hole for adjusting a height of a pedal plate
17: pedal arm
18: through-hole
19: fixing plate
20: fixing pin
21: fastening hole for adjusting a height of a pedal plate
22: cabin
23: fastening plate
24: fastening member
25: accommodation groove
26: fastening member
27: pedal plate cover
28, 29: side pillar
30: projection for preventing separation
31: hand bolt

DETAILED DESCRIPTION OF THE INVENTION

Hereinafter, an apparatus for adjusting a height and an angle of a footrest support for a construction machine in accordance with a preferred embodiment of the present invention will be described in detail with reference to the accompanying drawings.

Figure 2:
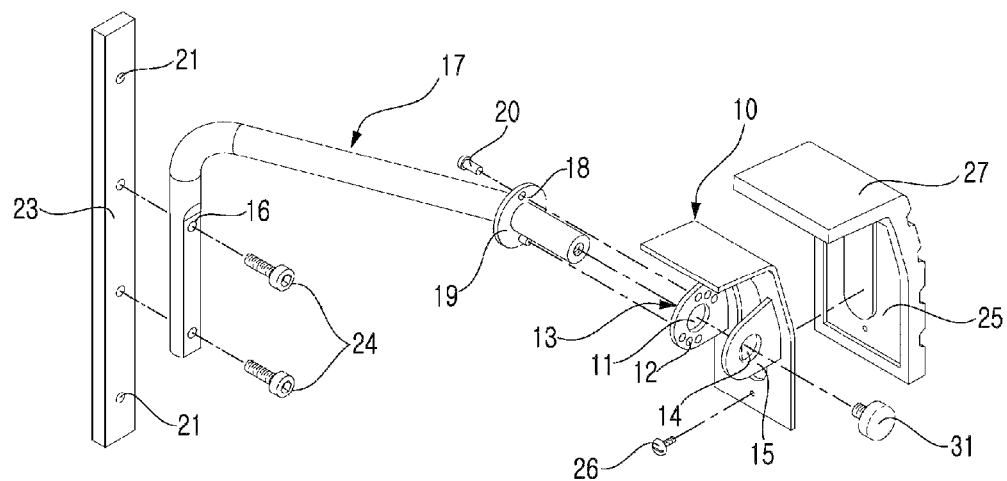
FIG. 2 is an exploded perspective view of an apparatus for adjusting a height and an angle of a footrest support for a construction machine according to an embodiment of the present invention.
Figure 3:
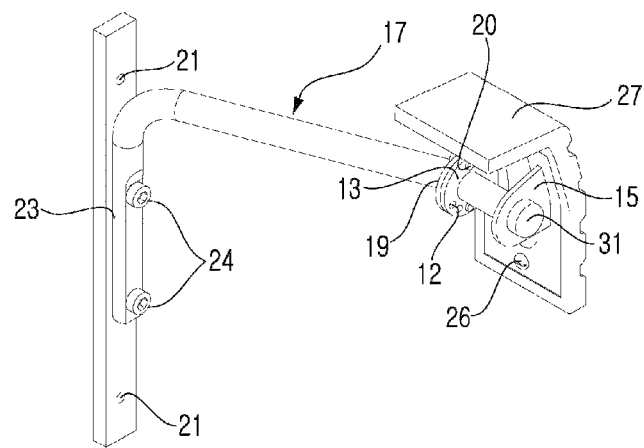
FIG. 3 is a perspective view of an apparatus for adjusting a height and an angle of a footrest support for a construction machine in a combined state according to an embodiment of the present invention.
Figure 4:
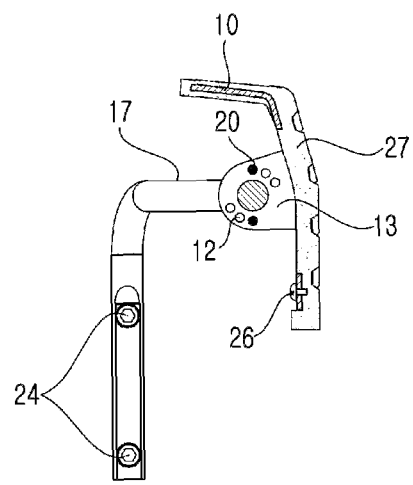
FIG. 4 is a cross-sectional view of an apparatus for adjusting a height and an angle of a footrest support for a construction machine according to an embodiment of the present invention.
Figure 5:
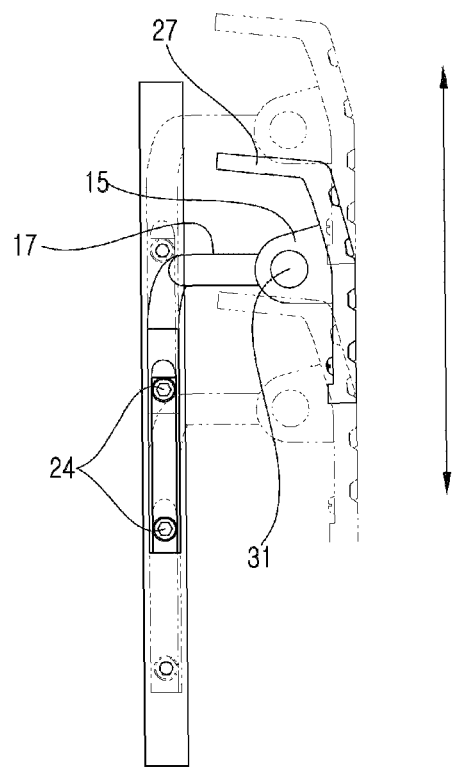
FIG. 5 is a view explaining height adjustment of a footrest support in an apparatus for adjusting a height and an angle of a footrest support for a construction machine according to an embodiment of the present invention.
Figure 6:
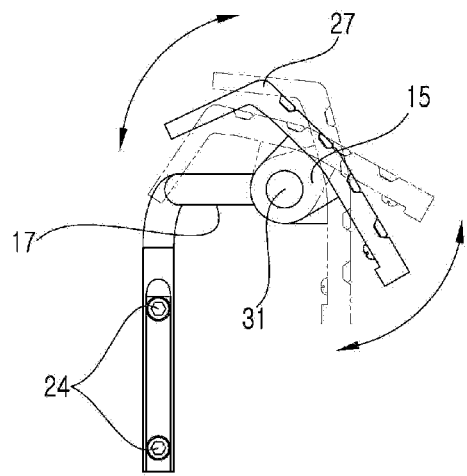
FIG. 6 is a view explaining height adjustment of a footrest support in an apparatus for adjusting a height and an angle of a footrest support for a construction machine according to an embodiment of the present invention.
Figure 7:
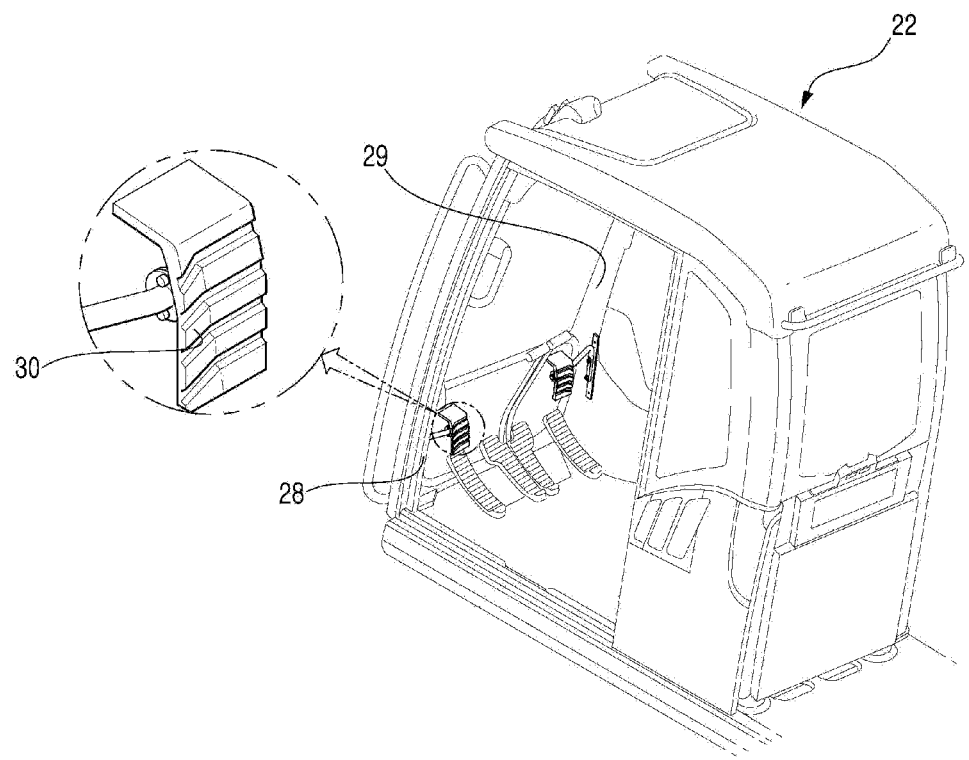
FIG. 7 is a view explaining a use state of an apparatus for adjusting a height and an angle of a footrest support for a construction machine according to an embodiment of the present invention.

FIG. 2 is an exploded perspective view of an apparatus for adjusting a height and an angle of a footrest support for a construction machine according to an embodiment of the present invention, FIG. 3 is a perspective view of an apparatus for adjusting a height and an angle of a footrest support for a construction machine in a combined state according to an embodiment of the present invention, and FIG. 4 is a cross-sectional view of an apparatus for adjusting a height and an angle of a footrest support for a construction machine according to an embodiment of the present invention. FIG. 5 is a view explaining height adjustment of a footrest support in an apparatus for adjusting a height and an angle of a footrest support for a construction machine according to an embodiment of the present invention, FIG. 6 is a view explaining height adjustment of a footrest support in an apparatus for adjusting a height and an angle of a footrest support for a construction machine according to an embodiment of the present invention, and FIG. 7 is a view explaining a use state of an apparatus for adjusting a height and an angle of a footrest support for a construction machine according to an embodiment of the present invention.

An apparatus for adjusting a height and an angle of a footrest support for a construction machine according to an embodiment of the present invention as illustrated in FIGS. 2 to 7 includes a pair of pedal plates 10 on which an operator's foot is put; a first bracket 13 formed on the other side of the pedal plate 10 and having a first through-hole 11 formed in the center thereof and a through-hole 12 for adjustment of an angle of the pedal plate 10 formed on the circumference thereof outside the first through-hole 11; a second bracket 15 formed on the other side of the pedal plate 10 to face the first bracket 13 and having a second through-hole 14 formed in the center thereof; a pedal arm 17 having one end fixed to the second bracket 15 through the first through-hole 11 and the other end having a through-hole 16 for adjustment of a height of the pedal plate formed thereon; a fixing plate 19 installed in a predetermined position of the pedal arm 17 and having a through-hole 18 formed thereon; a fixing pin 20 coupled to the through-hole 18 of the fixing plate 19 and the through-hole 12 for adjustment of the angle of the pedal plate, which selectively coincides with the through-hole 18, to keep the adjusted angle of the pedal plate 10; a fastening plate 23 installed in predetermined positions of left and right sides in a cabin 22 and having fastening holes 21 for adjustment of the height of the pedal plate formed thereon at equal intervals in upward and downward directions; and a fastening member 24 coupled to the through-hole 16 for adjustment of the height of the pedal plate and the fastening holes 21 for adjustment of the height of the pedal plate, which selectively coincides with the through-hole 16, to fix the other end of the pedal arm 17 to the fastening plate 23 in order to adjust the height of the pedal plate 10.

Preferably, the apparatus may further include a pedal plate cover 27 having the other side having an accommodation groove 25 formed thereon to accommodate the pedal plate 10 and fixed to the pedal plate 10 accommodated in the accommodation groove 25 through a fastening member 26.

The one end of the pedal arm 17 may be fastened to the second bracket 15 by a hand bolt 31 that is coupled to the second through-hole 14 and is screw-coupled to a coupling hole of the pedal arm 17.

An anti-slip portion may be formed on an upper surface of the pedal plate cover 27.

The fastening plate 23, to which the pedal arm 17 is fixed, may be installed in the predetermined positions of left and right side pillars 28 and 29 of the cabin 22 so that the operator's foot on the pedal plate 10 is maintained to avoid an interference in an operator's visual field.

The apparatus may further include a projection for preventing separation 30 formed at an edge of an outside of the upper surface of the pedal plate cover 27 to prevent the operator's foot from skidding and separating from the pedal plate cover 27.

The pedal plate cover 27 may be formed of a rubber material.

The through-holes 12 for adjustment of the angle of the pedal plate may be symmetrically formed on the same circumference based on the first through-hole 11 of the first bracket 13.

Hereinafter, a use example of an apparatus for adjusting the height and the angle of a footrest support for a construction machine according to an embodiment of the present invention will be described in detail.

A) Height adjustment of a pedal plate will be described.

As illustrated in FIGS. 1, 2, and 5, the height of the pedal plate 10 can be variably adjusted in accordance with physical conditions of an operator. That is, through-holes 16 (e.g., two through-holes may be formed) for adjusting the height of the pedal plate that is formed on the other end of the pedal arm 17 are made to coincide with two fastening holes that are selected from fastening holes 21 (e.g., four fastening holes may be formed) for adjusting the height of the pedal plate, which are formed at equal intervals in upward and downward directions on the fastening plate 23 that is fixed to the left and right side pillars 28 and 29 of the cabin 22.

Accordingly, by fastening the fastening member 24 to the through-hole 16 for adjustment of the height of the pedal plate of the pedal arm 17 and the fastening hole 21 for adjusting the height of the pedal plate of the fastening plate 23, which selectively coincides with the through-holes 16, the height of the pedal plate 10 that is fixed to one end of the pedal arm 17 can be adjusted to meet the physical conditions of the operator.

B) Angle adjustment of the pedal plate will be described.

As illustrated in FIGS. 1, 2, 4, and 6, the angle of the pedal plate 10 can be variably adjusted in accordance with the physical conditions of the operator. That is, the hand bolt 31, which fixes one end of the pedal arm 17 to the second bracket 15 that is formed on the other surface of the pedal plate 10, is partially released, and then the fixing pin 20, which is coupled to the through-hole 18 of the fixing plate 19 that is installed in a predetermined position of the pedal arm 17 and the through-hole for adjusting the angle of the pedal plate that is circumferentially formed on the first bracket 13 to selective coincide with the through hole 18, is separated therefrom (through this, one end of the pedal arm 17 may be rotated within the second through-hole 14 of the second bracket 15).

Accordingly, the pedal plate 10 is rotated clockwise or counterclockwise about the pedal arm 17 so that the angle of the pedal plate 10 meets the physical conditions of the operator, and in this case, the fixing pin 20 is coupled to the through-hole 18 of the fixing plate 19 and the through-hole 12 (through-hole that is oppositely formed on the circumference) selected among the through-holes 12 for adjusting the angle of the pedal plate of the first bracket 13 to selectively coincide with the through-hole 18.

Accordingly, the pedal plate 10 can keep a certain adjusted inclination angle, and in this case, the pedal plate 10 can be fixed to the pedal arm 17 through fastening of the hand bolt 31 to the screw hole that is formed at one end of the pedal arm 17 coupled to the second through hole 14 of the second bracket 15.

As illustrated in FIG. 6, in the case of rotating the pedal plate 10 counterclockwise about the pedal arm 17, the inclination angle of the pedal plate 10 can be adjusted to be gentle (indicated by a virtual line). On the other hand, in the case of rotating the pedal plate 10 clockwise about the pedal arm 17, the inclination angle of the pedal plate 10 can be adjusted to be steep (indicated by a virtual line).

Accordingly, the angle of the pedal plate 10 can be adjusted to meet the physical conditions of the operator.

On the other hand, as illustrated in FIG. 7, since the pedal plate cover 27 that surrounds the pedal plate 10 is formed of rubber and the upper surface of the pedal plate cover 27 is formed as a non-slip, the operator's foot can be prevented from skidding from the pedal plate 10.

Further, in the case where the equipment becomes inclined and thus the operator's body leans to one side, the projection for preventing separation 30 that is formed at the edge of the outside of the upper surface of the pedal plate cover 27 can prevent the operator's foot from skidding and separating from the pedal plate cover 27.

Although the present invention has been described with reference to the preferred embodiment in the attached figures, it is noted that equivalents may be employed and substitutions made herein without departing from the scope of the invention as recited in the claims.

INDUSTRIAL APPLICABILITY

According to the present invention having the above-described configuration, the height and the angle of the footrest support, on which the operator puts his/her foot, can be adjusted in accordance with physical conditions of the operator.

Further, the height and the angle of the footrest support can be easily adjusted through fastening of the bolts, and thus the present invention can be easily applied to the equipment.

Further, since the pedal-shaped footrest support is mounted adjacent to the left and right side pillars of the inside of the cabin, the operator's foot, which is put on the footrest support, does not interfere in the operator's forward visual field.

What is claimed is:

1. An apparatus for adjusting a height and an angle of a footrest support for a construction machine, comprising:
   a pair of pedal plates on which an operator's foot is put;
   a first bracket formed on the other side of the pedal plate and having a first through-hole formed in the center thereof and a through-hole for adjustment of an angle of the pedal plate formed on the circumference thereof outside the first through-hole;
   a second bracket formed on the other side of the pedal plate to face the first bracket and having a second through-hole formed in the center thereof;
   a pedal arm having one end fixed to the second bracket through the first through-hole and the other end having a through-hole for adjustment of a height of the pedal plate formed thereon;
   a fixing plate installed in a predetermined position of the pedal arm and having a through-hole formed thereon;
   a fixing pin coupled to the through-hole of the fixing plate and the through-hole for adjustment of the angle of the pedal plate, which selectively coincides with the through-hole, to keep the adjusted angle of the pedal plate;

a fastening plate installed in predetermined positions of left and right sides in a cabin and having fastening holes for adjustment of the height of the pedal plate formed thereon at equal intervals in upward and downward directions; and a fastening member coupled to the through-hole for adjustment of the height of the pedal plate and the fastening holes for adjustment of the height of the pedal plate, which selectively coincides with the through-hole, to fix the other end of the pedal arm to the fastening plate in order to adjust the height of the pedal plate.

2. The apparatus according to claim 1, further comprising a pedal plate cover having the other side having an accommodation groove formed thereon to accommodate the pedal plate and fixed to the pedal plate accommodated in the accommodation groove through a fastening member.

3. The apparatus according to claim 1, wherein the one end of the pedal arm is fastened to the second bracket by a hand bolt that is coupled to the second through-hole and a coupling hole of the pedal arm.

4. The apparatus according to claim 2, wherein a non-slip is formed on an upper surface of the pedal plate cover.

5. The apparatus according to claim 1, wherein the fastening plate, to which the pedal arm is fixed, is installed in the predetermined positions of left and right side pillars of the cabin so that the operator's foot put on the pedal plate is maintained to avoid an interference in an operator's forward visual field.

6. The apparatus according to claim 2, further comprising a projection for preventing separation formed at an edge of an outside of the upper surface of the pedal plate cover to prevent the operator's foot from separating from the pedal plate cover.

7. The apparatus according to claim 2, wherein the pedal plate cover is formed of a rubber material.

8. The apparatus according to claim 1, wherein the through-holes for adjustment of the angle of the pedal plate is symmetrically formed on the same circumference based on the first through-hole of the first bracket.

* * * * *